United States Patent [19]

Koslowski et al.

[11] Patent Number: 5,472,997
[45] Date of Patent: Dec. 5, 1995

US005472997A

[54] PROCESS FOR REPROCESSING PLASTIC WASTES

[75] Inventors: Thomas Koslowski, Aachen; Wolfgang Schmitz, Geilenkirchen; Olaf Musebrink, Ubach-Palenberg, all of Germany

[73] Assignee: Sicowa Verfahrenstechnik fur Baustoffe GmbH & Co., KG, Germany

[21] Appl. No.: 256,584

[22] PCT Filed: Jan. 15, 1993

[86] PCT No.: PCT/EP93/00095

§ 371 Date: Jul. 18, 1994

§ 102(e) Date: Jul. 18, 1994

[87] PCT Pub. No.: WO93/14154

PCT Pub. Date: Jul. 22, 1993

[30] Foreign Application Priority Data

Jan. 16, 1992 [DE] Germany .................. 42 00 915.4

[51] Int. Cl.⁶ .............. C08J 11/06; C08J 11/14; B29B 17/00
[52] U.S. Cl. ............ 523/307; 523/326; 521/40; 521/40.5; 521/45; 525/383; 525/388; 525/938; 526/940

[58] Field of Search ................... 523/307, 326; 525/383, 388, 938; 526/940; 521/40, 40.5, 45

[56] References Cited

U.S. PATENT DOCUMENTS

| | | | |
|---|---|---|---|
| 23,805 | 4/1859 | Baschnagel et al. | 521/45 |
| 25,160 | 8/1859 | Hall et al. | 521/45 |
| 2,873,474 | 3/1975 | Ficker | 260/2.3 |
| 3,098,046 | 7/1983 | Siggel et al. | 521/48 |
| 5,200,432 | 4/1993 | Bopp et al. | 521/40.5 |

FOREIGN PATENT DOCUMENTS

| | | | |
|---|---|---|---|
| 2646729 | 4/1977 | Germany | 521/45 |
| 9010667 | 9/1990 | WIPO | 521/48 |

*Primary Examiner*—Paul R. Michl
*Assistant Examiner*—Olga Asinovsky
*Attorney, Agent, or Firm*—Cushman Darby & Cushman

[57] ABSTRACT

The invention relates to a process for reprocessing plastic wastes, in which the plastic wastes filled into vessels are autoclaved as coherent, porous bundles with high water absorption capacity in a steam atmosphere at approximately 150° to 220° C., preferably 165° to 190° C., and melted by this means, at the end of the autoclaving process, the resulting bodies of molten plastic are at least partly dried by re-evaporating the water contained therein and are cooled.

28 Claims, 1 Drawing Sheet

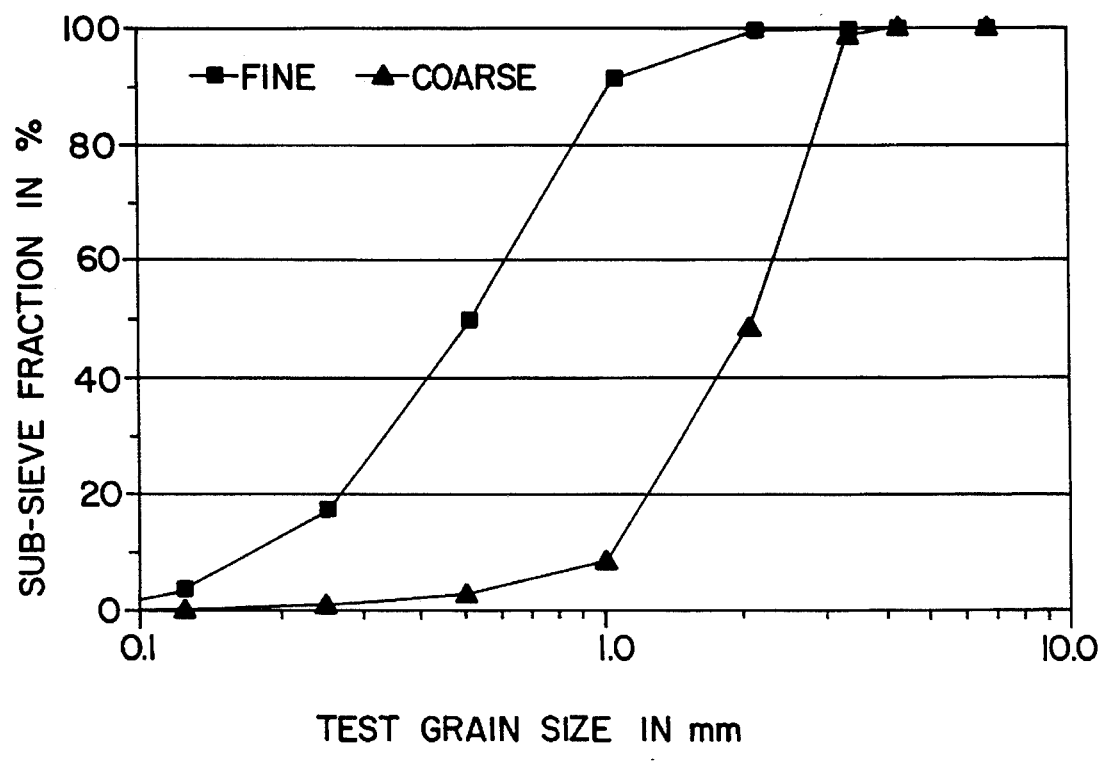

PROCESS FOR REPROCESSING PLASTIC WASTES

FIELD OF THE INVENTION

The invention relates to a process for reprocessing plastic wastes.

BACKGROUND OF THE INVENTION

Mixed-grade plastics from communal and/or industrial wastes cause considerable difficulties as regards possible reclamation because of the mixture of grades, on the one hand, and, on the other hand, because of the necessity of washing to remove impurities, especially since, even after washing, residues of impurities such as sand, foil fragments not made of plastic, wood pieces and the like, together with a corresponding residual moisture content are present.

Although it is known to compression mould flower pots, fence posts and the like from such plastic wastes under the effect of heat, these products are relatively inferior in quality, on the one hand, and, on the other hand, this does not result in an important product, but essentially only waste disposal, which otherwise does not lead to the processing of large amounts of wastes.

Nor are any of the pelletizing processes which are conventional in the plastics industry and used for pure-grade plastics suitable to allow large amounts of such plastic wastes, or even pure-grade plastic wastes, to be processed to form intermediate products which can be used forever. For example, a production of coarse-grained intermediate products, for example by means of a heated extruder, would be, because of the low power attainable, firstly uneconomical and secondly unsuitable with respect to the amounts produced. Difficulties are caused here by, inter alia, the poor thermal conductivity of the plastic wastes which impair the heating and cooling.

SUMMARY OF THE INVENTION

The object of the invention is to provide a process of the type mentioned at the outset which makes it possible to process plastic wastes economically in large amounts to form a product suitable for further use.

This object is achieved in that the plastic wastes filled into the vessel are autoclaved as coherent, porous bundles with a high water-absorption capacity in a steam atmosphere at approximately 150° to 220° C., preferably 165° to 190° C., and by this means melted, at the end of the autoclaving process, the resulting bodies of molten plastic are at least partly dried by re-evaporating the water content therein and are cooled.

This process is suitable in particular for mixed-grade plastics, such as occur especially in communal wastes, but also for pure-grade plastics. In addition, apart from meltable thermoplastics, thermosets, which do not melt but only decompose at a correspondingly high temperature, are tolerated in an amount up to less than approximately 50% by weight.

BRIEF DESCRIPTION OF THE DRAWINGS

FIG. 1 is a diagram showing the sub-sieve fraction, as a %, plotted as a function of the test grain size.

DETAILED DESCRIPTION

A washing system for cleaning the plastic wastes is usually present and it is expedient to use the plastic wastes further in the moist state, in particular with a moisture content of up to approximately 30% by weight, excess moisture having only been removed by vibrating or the like, since this moisture has a positive effect on the heat transport into the interior of the bundle during autoclaving. Material of this kind generally has a bulk density of the order of magnitude of 200 kg/m$^3$.

Since the plastic wastes from communal and/or industrial wastes are generally very inhomogeneous and, in the shredded state contain inter alia fibres, film scraps and lumpy particles, the plastic wastes are preferably first precomminuted. This may be carried out by means of cutting mills or the like and in particular with the aim of pregrinding the plastic wastes to form essentially particles which mat together, for example scraps or fibrous material with a greatest possible ratio of length to width and thickness.

The plastic wastes may be pressed and/or adhesively bonded to form coherent bundles, the pregrinding being intended to facilitate in particular the pressing.

The pressing may be carried out on refuse pressers or straw pressers or the like to form bundles in the form of large bales. The pressing may also be carried out on corresponding presses to form inherently stable cuboid or egg-shaped briquettes, which, depending on their shape, are stackable or are accommodated as bulk material by baskets or the like. The pressing may be carried out with plastic wastes with the moisture content as supplied (up to approximately 30% by weight moisture) or, if appropriate, with predried material (less than 20% by weight moisture). Apart from this, the use from material with a moisture content as supplied or predried material is dependent on the fineness of the plastic particles and on the press device used.

The individual bundles of pressed plastic wastes generally have a considerable elasticity, which has the effect that the bundles expand greatly again after leaving the press and assume a relatively irregular form. If appropriate, it is expedient here additionally to secure them against disintegrating using means such as a net, tapes, ropes or the like. In particular in the case of bales, this may be expedient. Instead, however, a supporting adhesion, for example with an organic adhesive, may be carried out.

By virtue of the pressing, compact, coherent bundles with a high water absorption capacity, that is to say with a multiplicity of highly water absorbing pores, can be produced from the plastic wastes.

Bundles may also be produced from the plastic wastes by the addition of an adhesive. However, when an organic adhesive is used, a relatively dry starting material is generally necessary, so that because of the additional adhesive and the drying which may be necessary, pressing is preferred. When an inorganic adhesive is used, for example gypsum, it is necessary to wait for it to harden, so that this, too, is generally less advantageous as regards the pressing.

The adhesion is to be carried out such that coherent bundles, which are also compact, with high water absorption capacity, that is to say with a multiplicity of highly water-absorbent pores, are produced.

The bundles, however, may also be formed in that the precomminuted plastic wastes are filled as a loose fill into receptacle containers, for example in the form of baskets, perforated troughs or the like, and, if appropriate, provided with a sufficient superimposed load to compress the plastic particles to such an extent that a multiplicity of highly water absorbing, that is to say sufficiently narrow, pores are formed so that the coherent bundle thus formed has a high water absorption capacity and a low air content which expands correspondingly during subsequent autoclaving. If the autoclave is evacuated before autoclaving, however, the superimposed load can be dispensed with since the water which is condensed from the steam can penetrate everywhere and heat the plastic appropriately.

The plastic used in the bundle may have a density of approximately 150 to 600 kg/m$^3$, depending on whether it is used as loose fill or compaction. It is thus possible to use a loose fill of approximately 150 kg/m$^3$ (dry), a fill compressed by superimposed load to approximately 350 kg/m$^3$ or bundles baled to approximately 500 kg/m$^3$.

A release agent, for example in the form of silicone oil or a kraft paper insert or the like, is expedient for the receptacle container.

The bundles are introduced into an autoclave. Depending on the type of bundle, they are stacked, for example, on pallet-like supports or the like, possibly with the arrangement of intermediate meshes or the like in layers or are received by receptacle containers, for example in the form of baskets, perforated troughs or the like, so that their surfaces are as accessible as possible for an ingress of steam. If appropriate, release agents may be arranged between the supports or receptacle containers and the bundles. These may be, if appropriate, oil-bound or wax-bound pulverulent release agents, silicone oil, kraft paper layers or the like.

If appropriate, the bundles disposed in the autoclave are first flushed with steam and/or subjected to evacuation. The larger the bundle or the looser the fill, the more important this is for the economic efficiency.

During subsequent autoclaving in the steam atmosphere at approximately 150° to 220° C., preferably approximately 165° to 190° C., at pressures for example between 5 and 16 bar, the steam condenses on the surface, which is at first still cold, of the bundle and the condensed water formed thereby penetrates by virtue of the capillary action of the highly water absorbing pores of the bundle and/or by gravitational effect into the bundle. As a result, there is a very rapid heat transport by diffusion from the exterior into the interior of the bundle. By virtue of this heating, the plastic particles are caused to melt and to fuse together, specifically also in the interior of the bundle. When this takes place, the bundles partially collapse.

Delimitations, for exhale in the form of trays or the like, are expediently provided in the autoclave, and can intercept the molten plastic if it is not already prevented by its receptacle container or the like from flowing away or dripping down. In this arrangement, the receptacle containers or interception containers are provided with small openings for water drainage, which, however, keep back the plastic, so that less water has to be removed during subsequent drying.

Suitable receptacle containers are, for example, slightly conical containers which make possible the steam access to the plastic, for example via appropriate openings, and have bases which can be pressed out or side walls which can be folded down to ensure easy removal of the block-shaped body formed from the molten plastic.

Because of the rapid heat transport, long residence times in the autoclave are not required, but rather only relatively short residence times of the order of magnitude of approximately half an hour or even considerably less, for example 10 min, after the heating up of the autoclave. The time required for heating and for melting, however, is, inter alia, format-dependent.

Autoclaves such as are conventional in the construction industry can receive large quantities, so that, together with the necessary short autoclaving times, large amounts can be throughput.

Since the bundles at first expand strongly under the effect of heat in the autoclave because of the contained air, it is furthermore expedient to provide the bundles with a superimposed load. By this means pores present are compressed and the capillarity is increased, so that the heat transport is accelerated. In addition, by this means there is a denser fusion. Lateral holding together, for example by means of basket walls, trough walls or the means listed above for holding together or supporting the bales, during the autoclaving may also be expedient in this case. However the bundles may also be autoclaved in self-supporting form.

During shutdown of the autoclave, a re-evaporation of the water disposed in the bodies consisting of molten plastic, and thus an additional drying, up to approximately 100° C., take place. The evaporation coldness caused by this leads to a rapid cooling of the bodies, the latter losing their adhesiveness and plastic consistency. The subsequent cooling of the bodies takes place relatively rapidly. Autoclaving is expediently carried out by means of saturated steam, however autoclaving may be carried out with superheated steam so as to dry additionally during autoclaving.

By virtue of the remelting taking place during autoclaving, bodies with densities in the region of approximately 500 to 750 kg/m$^3$, in particular 600 to 700 kg/m$^3$, are obtained. The relatively dense bodies, that is to say having few interspaces, thus obtained may be temporarily stored, for example for cooling and, if appropriate, transported as such, with their relatively small volume in comparison to ground powder, to a consumer.

The bodies obtained by autoclaving, comprising molten plastic particles fused together, are distinguished in that they are relatively lightweight and have an extraordinarily good thermal insulation and high strength. Accordingly, mouldings can be cut therefrom to an appropriate format, which can be used as such for appropriate purposes.

In particular, however, these bodies—if appropriate together with the wastes from the mouldings—are processed by cutting and grinding to form grain fractions which are suitable for further use as materials or, if appropriate, also in incineration. In particular, after cutting, drying, for example with hot air, down to a degree of moisture content suitable for the subsequent grinding may possibly be carried out. If appropriate, however, the molten plastic may also be dried as a whole body, such as is obtained after autoclaving.

Thus, from this a coarse-grained material can be produced which has, for example, a cubic, splintery or round grain, whose grain size is dependent on the intended use and which may have a bulk density in the range from approximately 300 to 330 kg/m$^3$ (including moisture). Thus, for example, a grain size up to 32 mm is suitable as lightweight aggregate for concrete (for example prefabricated concrete elements). Grain sizes of 8 mm, 4 mm, 2 mm, etc., with a correspondingly broad or narrow grain band or else flour are suitable as additives for special plasters, screeds, masonry mortars, grouting compositions, below-ground construction materials such as insulating construction materials or backfilling construction materials, raw mixtures for the production of various masonry bricks, and the like, which are modified in this manner with polymer granules. It is advantageous, in addition, that no fine fraction occurs during grinding if the material is not ground to a correspondingly small grain size. For example, fine grinding to a bulk density of approximately 20 to 30 kg/m³ may take place.

Hence, in the accompanying diagram, in which the sub-sieve fraction in % is plotted as a function of the test grain size, two grading curves, for a fine and coarser powder, which were obtained by grinding the plastic melted in the autoclave, are shown.

Release agents in the form of kraft paper or the like, and also means for holding together or supporting the bales, can, if appropriate, be co-ground and in this case represent sacrificial agents or means.

We claim:

1. A process for reprocessing plastic wastes comprising the steps of:

precomminuting plastic waste then bundling the comminuted plastic waste into coherent, porous water absorbing bundles so that water can move throughout the bundle;

introducing the prepared waste plastic in bundled form into a vessel;

autoclaving the waste plastic in a pressurized steam atmosphere at a temperature of approximately 150°–220° C. and at pressures of approximately 5 to 16 bar so that heat transporting moisture penetrates the porous bundle and the plastic waste is melted sufficiently to fuse the plastic waste together in the bundled form;

at least partially drying the fused plastic bundle at the conclusion of autoclaving by evaporating water contained in the fused plastic waste bundle; and cooling the fused plastic waste.

2. A process as in claim 1 wherein the plastic waste is mixed-grade plastic waste.

3. A process as in claim 1 wherein the plastic waste is single-grade plastic waste.

4. A process according to claim 1 including the additional step of securing the bundles in the formed condition.

5. A process according to claim 1 wherein the step of precomminuting the plastic wastes includes producing elongate particles and strands of plastic.

6. A process according to claim 1 wherein the plastic waste has a moisture content up to approximately 30 percent.

7. A process according to claim 1 wherein the step of preparing plastic waste produces bundles with a bulk density of approximately 150 to 600 kg/m³.

8. A process according to claim 1 wherein the step of preparing includes compacting the plastic waste into bundles.

9. A process according to claims 1 and 8 wherein the step of preparing includes the additional step of adhesively bonding the plastic waste together to form bundles.

10. A process according to claim 9 wherein in the step of adhesively bonding includes applying an inorganic adhesive as the bonding material.

11. A process according to claim 1 wherein autoclaving occurs at temperatures of preferably 165° to 190° C.

12. A process according to claim 4 wherein the bundles are held together by processible means.

13. A process according to claim 1 wherein the forming step further includes the additional step of placing precompacted plastic waste into a vessel such that the precompacted plastic waste includes interstices permitting the ingress of steam within the precompacted plastic waste, wherein the vessel has openings formed therein to permit the steam atmosphere of the autoclaving step to pass therethrough.

14. A process according to claim 13 wherein prior to the step of autoclaving, the vessel which receives the precompacted waste for autoclaving is provided with a release agent.

15. A process according to claim 1 wherein the step of forming the plastic waste into porous bundles includes the additional step of forming the plastic waste into stackable bundles.

16. A process according to claim 1 including the additional step of steam flushing the plastic waste prior to the step of autoclaving.

17. A process according to claims 1 and 16 including the additional step of evacuating the plastic waste before the step of autoclaving.

18. A process according to claim 1 wherein the step of autoclaving includes autoclaving the plastic waste under a superimposed load.

19. A process according to claim 1 wherein the resulting cooled plastic waste has a density of approximately 500 to 700 kg/m³.

20. A process according to claim 19 wherein the density varies from approximately 600 to 700 kg/m³.

21. A process according to claim 1 wherein following cooling, the resulting cooled plastic is subjected to the additional step of comminutating the plastic into pieces.

22. A process according to claim 21 wherein the comminutating step produces shaped plastic pieces.

23. A process according to claim 21 wherein the comminutating step produces a granular form of material.

24. A process according to claim 21 wherein the comminutating step produces a substantially powder material.

25. A process according to claim 1 wherein following cooling the resulting plastic material is coarsely comminutated to a bulk density of approximately 300 to 335 kg/m³.

26. A process according to claim 1 wherein following cooling the resulting plastic material is subjected to the additional step of finely grinding the material to a bulk density of approximately 20 to 30 kg/m³.

27. A process as in claim 10 wherein the inorganic adhesive is gypsum.

28. A process as in claim 1 wherein said plastic waste consists essentially of thermoplastic and thermoset materials.

* * * * *